(12) United States Patent
Kashi et al.

(10) Patent No.: US 8,051,309 B2
(45) Date of Patent: Nov. 1, 2011

(54) METHOD AND APPARATUS TO COMBINE POWER AND CONTROL SIGNALS IN A MOBILE COMPUTING DEVICE

(75) Inventors: Mostafa Kashi, Sunnyvale, CA (US); Yoon Kean Wong, Redwood City, CA (US); Jerome Tu, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 615 days.

(21) Appl. No.: 12/201,777

(22) Filed: Aug. 29, 2008

(65) Prior Publication Data

US 2010/0057970 A1    Mar. 4, 2010

(51) Int. Cl.
| | |
|---|---|
| G06F 1/00 | (2006.01) |
| G05B 11/01 | (2006.01) |
| G08C 19/12 | (2006.01) |
| H04L 27/00 | (2006.01) |
| H04B 1/06 | (2006.01) |
| H04M 9/00 | (2006.01) |

(52) U.S. Cl. ............... 713/310; 713/300; 340/12.32; 340/13.23; 340/538; 375/259; 455/270; 455/402

(58) Field of Classification Search ............ 713/300, 713/310; 340/12.32, 13.23, 538; 375/259; 455/270, 402
See application file for complete search history.

(56) References Cited

U.S. PATENT DOCUMENTS

| | | | |
|---|---|---|---|
| 4,639,714 A | 1/1987 | Crowe | |
| 6,329,906 B1 | 12/2001 | Fisher et al. | |
| 6,995,658 B2 * | 2/2006 | Tustison et al. | ............ 375/219 |
| 7,325,150 B2 | 1/2008 | Lehr et al. | |
| 7,327,223 B1 * | 2/2008 | Schlinger | ............ 340/12.32 |
| 7,460,934 B2 * | 12/2008 | Yanagida et al. | ............ 701/1 |
| 2005/0163309 A1 * | 7/2005 | Kim | ............ 379/413 |
| 2005/0181839 A1 * | 8/2005 | Tiainen et al. | ............ 455/573 |
| 2007/0206658 A1 | 9/2007 | Park et al. | |
| 2008/0129468 A1 | 6/2008 | Matsuoka | |
| 2008/0143492 A1 | 6/2008 | Shaffer et al. | |

FOREIGN PATENT DOCUMENTS

WO    2007130349 A2    11/2007

OTHER PUBLICATIONS

International Search Report and Written Opinion for PCT/US2009/055102, Mailed Apr. 19, 2010, 11 pages.

* cited by examiner

*Primary Examiner* — Stefan Stoynov

(57) ABSTRACT

A mobile computing device is described that includes multiple device components, a power supply and a power line connected to each device component. The power supply is operative to provide power signals to the device components over the power lines. The mobile computing device also includes a processor operative to generate a control signal for one or more device components. A power line communications control module is connected to the power supply and the processor, the power line communications control module is operative to receive a power signal and a control signal for a device component, combine the power signal and control data from the control signal to form a power data signal, and send the power data signal to the device component over a corresponding power line. Other embodiments are described and claimed.

26 Claims, 4 Drawing Sheets

METHOD AND APPARATUS TO COMBINE POWER AND CONTROL SIGNALS IN A MOBILE COMPUTING DEVICE

BACKGROUND

Mobile computing devices, such as smart phones, may provide a wide array of processing capabilities such as digital assistant (PDA) features, including word processing, spreadsheets, synchronization of information (e.g., e-mail) with a desktop computer, and so forth. In addition, such devices may have wireless communications capabilities to provide features, such as mobile telephony, mobile e-mail access, web browsing, and content (e.g., video and radio) reception. Exemplary wireless communications technologies include cellular, satellite, and mobile data networking technologies.

Providing such an array of functionality in a single device involves a multitude of control and power lines. As mobile computing devices continue to decrease in size and the amount of power required to provide the ever increasing array of capabilities continues to increase, conservation of space within mobile computing devices becomes an important consideration. As a result, it is desirable to consolidate signals and signal lines when possible. For example, it may be advantageous to combine power signals and control data on power lines. Consequently, there exists a substantial need for techniques to improve the management of signals within a mobile computing device.

DETAILED DESCRIPTION

Figure 1:
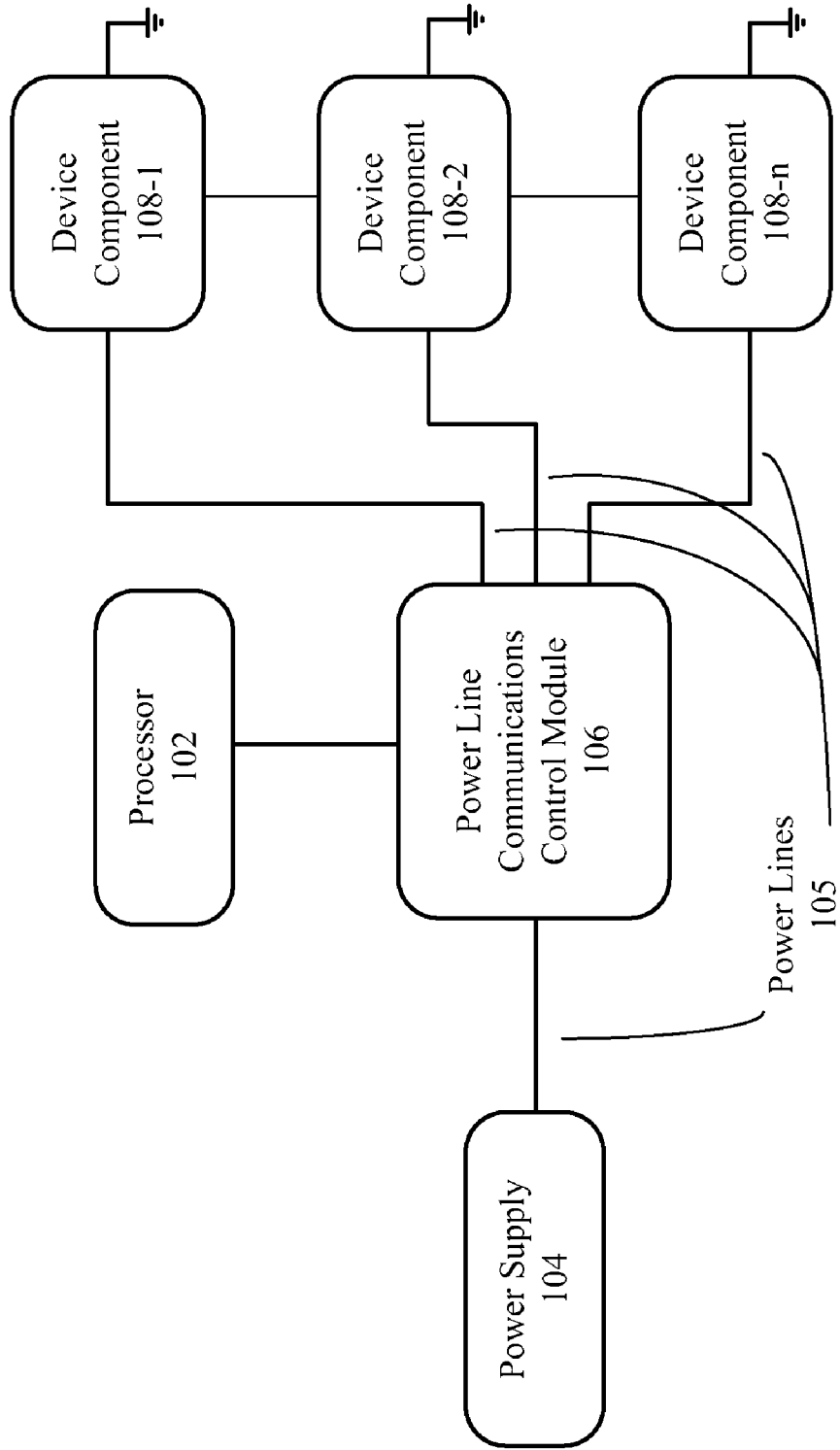
FIG. 1 illustrates one embodiment of a first mobile computing device.

Various embodiments may be generally directed to signal control techniques for a mobile computing device, such as a smart phone. Some embodiments may be particularly directed to combining power signals with control data from control signals over power lines to power and control device components.

In one embodiment, for example, a mobile computing device may include multiple device components. Device components may include any component connected to or in communication with a mobile computing device. Examples of device components include, but are not limited to, keypads, keyboards, thumbboards, displays, motors, wireless radios, I/O interfaces and A/V devices such as cameras, speakers and microphones. A mobile computing device may also include a power supply having a power line connected to each device component. In some embodiments, the power supply may be operative to provide power signals to the device components over the power lines.

A mobile computing device may further comprise a processor operative to generate a control signal for one or more of the device components. The processor may be any suitable type of general purpose or host processor. In various embodiments, a mobile computing device may include a power line communications control module to connect to the power supply and the processor. The power line communications control module may be operative to receive a power signal from the power supply and a control signal from the processor, both signals intended for a device component. In some embodiments, the power line communications control module may combine the power signal and control data from the control signal to form a power data signal that is sent to the device component over a corresponding power line. Other embodiments are described and claimed.

Combining power signals and control data over power lines may provide several advantages. For example, reducing the number of control lines needed in a mobile computing device may save valuable space within the device. Furthermore, reducing the number of lines within a mobile computing device or on a specific printed circuit board (PCB) may reduce the interference within the device. Additionally, consolidating signals may reduce the power consumption of the system, thereby increasing battery life for a battery powered mobile computing device. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals. Other embodiments are described and claimed.

FIG. 1 illustrates one embodiment of a mobile computing device. In particular, FIG. 1 shows a first embodiment of a mobile computing device 100. The mobile computing device 100 may include by way of example and not limitation a processor 102, a power supply 104, power lines 105, a power line communications control module 106 and device components 108-1 through 108-n. These elements or portions of these elements may be implemented in hardware, software, firmware, or in any combination thereof. Mobile computing device 100 may also include a housing to contain the device components 108-1 through 108-n, the power supply 104, the processor 102, and the power line communications control module 106. The embodiments are not limited to these depicted elements.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

The processor 102 may comprise a general purpose processor or an application specific processor arranged to provide general or specific computing capabilities for the mobile computing device 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

Power supply 104 may comprise any power source arranged to supply and manage power to the elements of the mobile computing device 100. In various embodiments, the power supply 104 may comprise an alternating current power line, and the power signal may comprise an alternating current signal. For example, the power supply 104 may comprise an alternating current (AC) adapter to draw power from a standard AC main power supply. In some embodiments, the power supply 104 may comprise a battery, and the power signal may comprise a direct current signal. The battery may comprise a rechargeable battery, such as a removable and rechargeable lithium ion battery to provide direct current (DC) power, for example.

In various embodiments, the power lines 105 may comprise any conductive material suitable for transferring an electric current. The power lines 105 may comprise any system that conducts energy through any means or medium, for example. In some embodiments, the power lines 105 consist of copper material, for example. The power lines 105 may comprise conductive pathways, or traces, etched from copper sheets laminated onto a non-conductive substrate, such as pathways or traces on a PCB, for example. In some embodiments, the power lines may include shielding or any other coating suitable for reducing or eliminating interference on the power line 105 or caused by the power line 105. The power lines 105 connect the power supply 104 with each of the multiple device components 108-1 through 108-n to provide power signals to the device components 108-1 through 108-n. Other embodiments are described and claimed.

Device components 108-1 through 108-n may comprise n number of components forming part of mobile computing device 100. For example, device components 108-1 through 108-n may comprise keypads, keyboards, thumbboards, LEDs, displays, touchscreen displays, vibrate motors, wireless radios, I/O interfaces or A/V devices such as speakers or microphones. While a limited number and type of device components 108-1 through 108-n are shown by way of example, it should be understood that any number or type of device components may be present in the mobile computing device 100 and still fall within the described embodiments.

The power line communications control module 106 may comprise a hardware or software module connected to the power supply 104, the processor 102 and the device components 108-1 through 108-n. In some embodiments, power line communications control module 106 may be implemented as a software module stored in the form of executable program instructions, code or data on memory to be executed by a processor, such as processor 102 for example. The memory may comprise computer-readable media such as volatile or non-volatile memory units arranged to store programs and data for execution by the processor 102. The processor 102 may retrieve and execute the program instructions, code or data from the memory to perform the signal consolidation operations for the mobile computing device 100. It should be appreciated that the power line communications control module 106 may be stored and executed by any memory and processing resources available to the mobile computing device 100. Further, it should be appreciated that the operations for the power line communications control module 106 may be implemented in hardware as well using one or more integrated circuits, for example. The embodiments are not limited in this context.

In various embodiments, the power line communications control module 106 is operative to receive a power signal from the power supply 104 and a control signal from the processor 102 or from another power line communications control module, the power signal and the control signal intended for at least one of device components 108-1 through 108-n. In various embodiments, control and power signals may also be sent from power line communications module 106 to any of processor 102 or device components 108-1 through 108-n. In some embodiments, the power line communication control module 106 is configured to combine the power signal and control data from the control signal to form a power data signal, and send the power data signal to the device component 108-1 through 108-n over a corresponding power line 105 or extract/demodulate control data from a received power data signal. In various embodiments, the power line communications control module 106 may be configured as part of or incorporated with one or more of the multiple device components 108-1 through 108-n.

The control data may comprise, for example, data that activates, directs, operates, verifies or otherwise manipulates one of device components 108-1 through 108-n. For example, a control signal generated by processor 102 and intended for a thumbboard device component may contain control data instructing the thumbboard to illuminate based on a predefined set of criteria. A control signal intended for a camera device, for example, may contain control data from a button device component instructing the camera to capture an image. Other embodiments are described and claimed.

The power line communications control module 106 may by operative to form the resulting power data signal with a first signal component representing the power signal and a second signal component representing the control data from the control signal. For example, the power data signal may consist of two separate signal components having different frequencies. In some embodiments, the first signal component may a lower frequency than the second signal component. For example, the power data signal may be transmitted over the power lines 105 using a lower frequency that the control data from the control signal. In other embodiments, the first signal component may have a higher frequency than the second signal component. For example, the control data from the control signal may be transmitted using a lower frequency than the power data signal. While specific embodiments may be generally directed to frequency modulation, it should be understand that any suitable modulation technique could be used and still fall within the described embodiments, such as pulse amplitude modulation for example. Other embodiments are describe and claimed.

Figure 2:
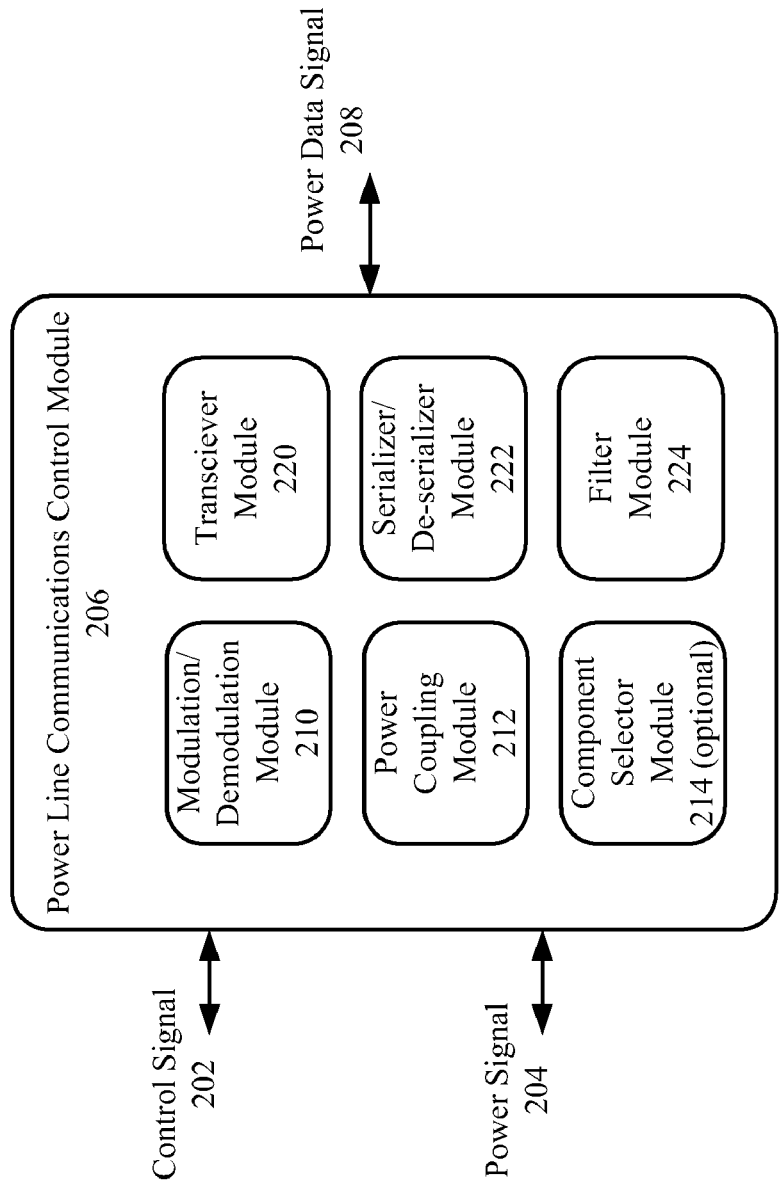
FIG. 2 illustrates one embodiment of a module.

FIG. 2 illustrates one embodiment of a module 200. In particular, FIG. 2 shows a power line communications control module 206 that may be representative of power line communications control module 106 of FIG. 1, for example. The power line communications control module 206 may include by way of example and not limitation a modulation/demodulation module 210, a power coupling module 212, a component selector module 214 (optional), a transceiver module 220, a serializer/de-serializer module 222 and a filter module 224. These elements or portions of these elements may be implemented in hardware, software, firmware, or in any combination thereof. The embodiments are not limited to these depicted elements. It should be understand that power line communications control component module 208 may be implemented as part of or in communication with any or all of device components 108-1 through 108-n of FIG. 1, in various embodiments.

The power line communications control module 206 may be configured to receive as inputs a control signal 202 and a power signal 204 and/or a combined power data signal 208. The control signal 202 may be a control signal 202 from a processor, such as processor 102 of FIG. 1 for example. In various embodiments, the control signal 202 may also be received from another device component. The control signal 202 may contain control data intended for a device component, such as any of device components 108-1 through 108-n. The power signal 204 may be a power signal from a power supply, such as power supply 104 of FIG. 1 for example. Power data signal 208 may comprise a combination of control data from control signal 202 and power signal 204.

Modulation/Demodulation module 210 may be operative to modulate the power signal 204 with the control data from the control signal 202 to form the power data signal 208 if the control signal 202 and the power signal 204 are received separately. Modulation/demodulation module 210 may also be configured to demodulate a power signal and control data from a control signal if a power data signal 208 is received as an input in various embodiments.

Modulation/demodulation module 210 may allow for multiple information signals, such as power signal 204 and the control data from control signal 202, to be transferred simultaneously over the same shared physical medium. The control data from control signal 202 and the power signal 204 may be communicated using different frequencies. For example, modulation module 210 may modulate the control data from control signal 202 on top of, or with a higher frequency that the power signal 204. While specific embodiments may be generally directed to frequency modulation, it should be understand that any suitable modulation technique could be used and still fall within the described embodiments, such as pulse amplitude modulation for example. Other embodiments are described and claimed.

In various embodiments, the control data from control signal 202 may be serialized into a single stream for modulation with power signal 204. For example, serializer/de-serializer 222 may serialize control data from control signal 202 into a single stream for modulation by modulation/demodulation module 210. Serializer/de-serializer 222 may comprise any suitable serializer/de-serializer capable of serializing and/or de-serializing a data stream. The modulated power data signal 208 may be communicated over the power lines to other devices, such as device components 108-1 through 108-n of FIG. 1.

The power data signal 208 may be transmitted using transceiver module 220. Transceiver module 220 may comprise a combination receiver and transmitter, capable of communicating a data stream to other components within mobile computing device 100 and receiving a data stream from other component within mobile computing device 100, for example.

In various embodiments, any of device components 108-1 through 108-n that includes a power line communications control module may be capable of receiving a modulated power data signal 208 and demodulating the signal using modulation/demodulation module 210 to extract the control data intended for that device component. Each device component may further comprise a filter module 224 capable of filtering out and identifying control data intended for that device component. Filter module 224 may comprise any type of filter such as a low pass, high pass, band pass or any other type of filter suitable for isolating control data intended for a device component. Other embodiments are described and claimed.

In some embodiments, the mechanism by which each device puts its control data onto the power lines may use various industry standard techniques. For example, carrier sense multiple access, collision detection and avoidance and orthogonal frequency division multiplexing modulation may all be used and still fall within the described embodiments. In some embodiments, the control data to be serialized or modulated with the power signal 208 may have a distinct format. For example, the serialized control data may consist of a preamble, a device address, control data and an error check sequence. While a limited number of format options are shown by way of example, it should be understood that the serialized or modulated data may take any form and still fall within the described embodiments.

Power coupling module 212 may be coupled to the power lines 105 and may be operative to receive the power signal 204 from the power supply 104 or a power data signal 208 from another device component and send the power data signal 208 to the device components 108-1 through 108-n over the power lines 105. Power coupling module 212 may comprise any coupler capable of dividing, splitting, directing or allocating power in mobile computing device 100. In various embodiments, power coupling module 212 receives power from a power supply, such as power supply 104, and allocates the necessary amount of power to a device component, such as any of device components 108-1 through 108-n, according to the needs of the particular device component. Other embodiments are described and claimed.

Component selector module 214 (optional) may be operative to select the power line 105 connected to the device component 108-1 through 108-n for use in communicating the power data signal 208. For example, each device component 108-1 through 108-n may be connected to the power line communications control module 206 via a separate power line 105. Component selector module 214 may be configured to receive filtered control data from filter module 224 and direct the control data to the appropriate intended device component 108-1 through 108-n through its associated power line 105. In this manner, component selector module 214 may assist in preventing control data from being communicated to unintended device components. As illustrated, component selector module 214 is optional. For example, component selector module 214 may not be necessary in certain embodiments in which each device component includes a power line communications control module to send/receive, modulate/demodulate, serialize/de-serialize and filter control and power data signals.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 3:
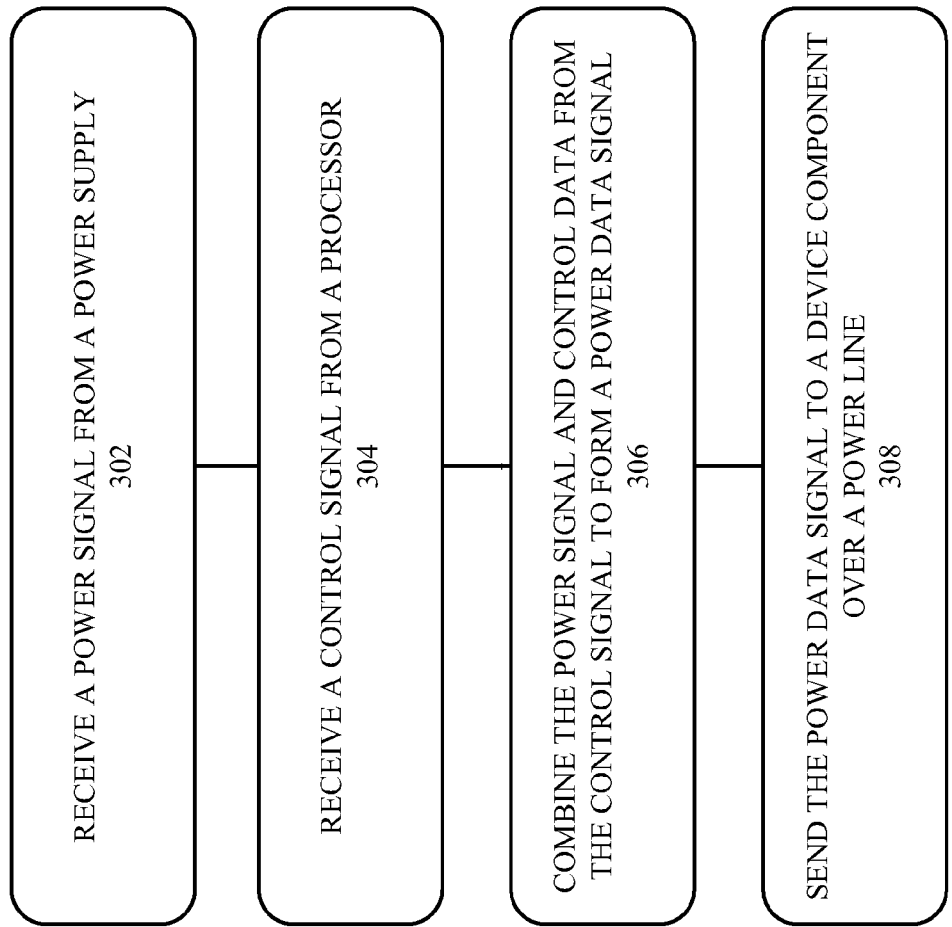
FIG. 3 illustrates one embodiment of a logic diagram.

FIG. 3 illustrates a logic diagram. In particular, FIG. 3 illustrates a logic diagram 300, which may be representative of the operations executed by one or more embodiments described herein. As shown in the FIG. 3, a power signal may be received from a power supply at 302 and a control signal may be received from a processor at 304. At 306, the power signal and control data from the control signal may be combined to form a power data signal. The power data signal is sent to a device component over a power line at 308. For example, the power line communications control module 106 may receive a power signal from power supply 104 and a control signal from a processor 102, combine the power signal and control data from the control signal to form a power data signal, and send the power data signal to one of device components 108-1 through 108-n.

In one embodiment, the power data signal is formed with a first signal component representing the power signal and a second signal component representing the control data from the control signal. In some embodiments, the first and second signal components comprise different frequencies. For example, the first signal component may have a lower frequency than the second signal component or the first signal component may have a higher frequency than the second signal component.

In various embodiments, the power signal and the control data from the control signal are modulated to form the power data signal. For example, modulation module 210 of power line communications control module 206 may modulate control data from control signal 202 with power signal 204 to form power data signal 208. In some embodiments, more than one control or data signal may be modulated on a single power line. For example, two or more control signals may be modulated with a power signal to form a power data signal. Other embodiments are described and claimed.

The power lines may be coupled to the device components in various embodiments. For example, power coupling module 212 of power line communications control module 206 may couple power signal 204 from power supply 104 to each of device components 108-1 through 108-n through power lines 105.

In one embodiment, the power line connected to the device component for use in communicating the power data signal may be selected. For example, component selector module 214 of power line communications control module 206 may select a power line 105 connected to one of device components 108-1 through 108-n based on the intended recipient device for certain control data from control signal 202. Other embodiments are described and claimed.

Figure 4:
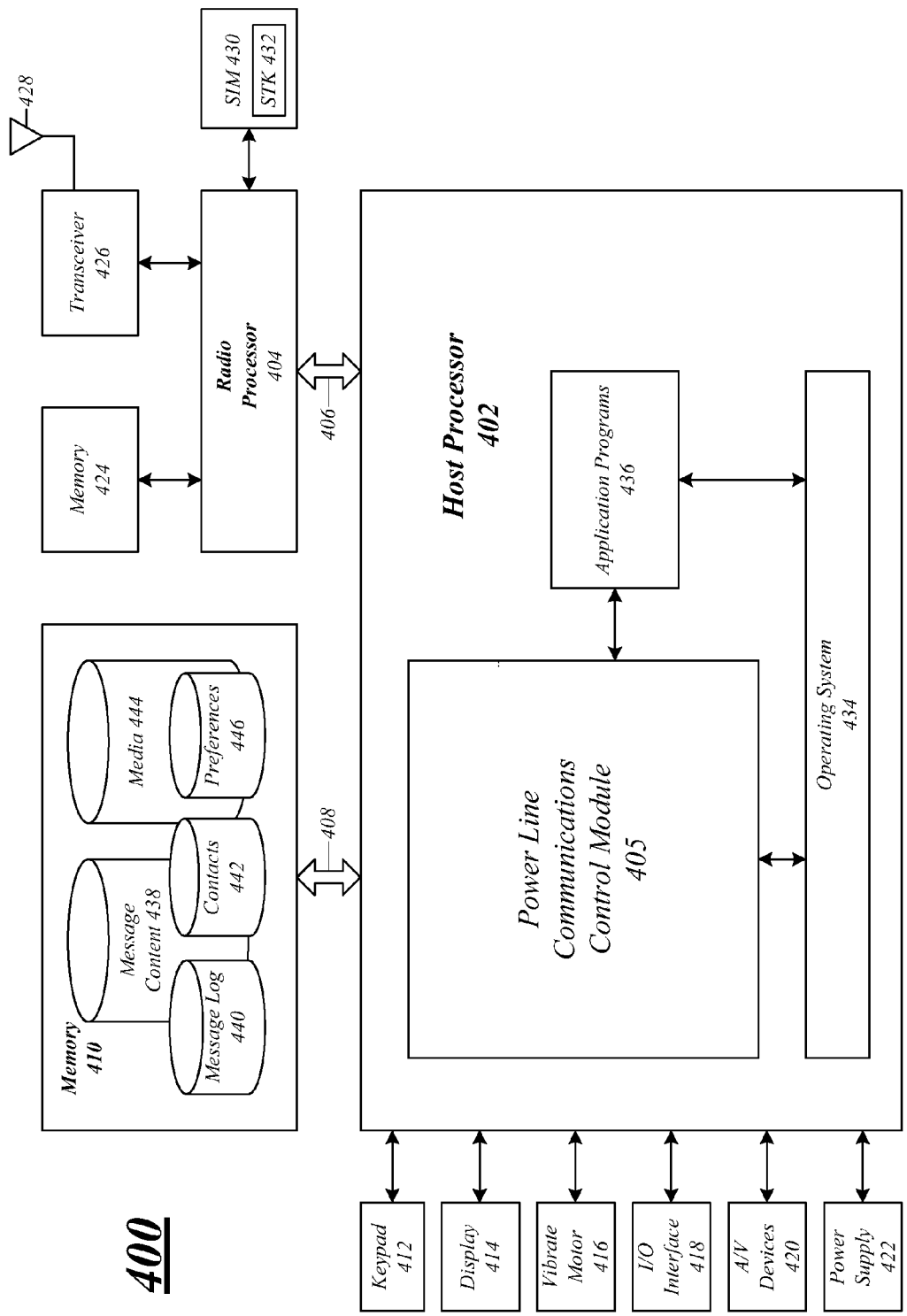
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414. The keypad may also comprise a thumbboard.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and synchronous dynamic random access memory (SDRAM). Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a power line communications control module 405. The power line communications control module 405 may the same or similar to the power line communications control module 105 described with reference to FIG. 1 or the power line communications control module 206 described with reference to FIG. 2.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device comprising:
   multiple device components;
   a power supply having a power line connected to each device component, the power supply operative to provide power signals to the device components over the power lines;
   a processor operative to generate a control signal for one or more device components; and
   a power line communications control module to connect to the power supply and the processor, the power line communications control module operative to receive a power signal and a control signal for a device component, combine the power signal and control data from the control signal to form a power data signal, and send the power data signal to the device component over a corresponding power line, the power line communications control module comprising a component selector module, the component selector module operative to select the power line connected to the device component for use in communicating the power data signal.

2. The mobile computing device of claim 1 wherein each of the multiple device components comprises a separate power line communications control module, each power line communications control module further operative to:
   receive a power data signal from a device component;
   demodulate the power data signal into separate control and power signals; and
   filter control data from the control signal for the receiving device component.

3. The mobile computing device of claim 1, the power line communications control module operative to combine more than one control signal with the power signal to form the power data signal, wherein one or more of the control signals includes data.

4. The mobile computing device of claim 1, comprising a housing to contain the device component, the power supply, the processor, and the power line communications control module.

5. The mobile computing device of claim 1, the power line communications control module operative to form the power data signal with a first signal component representing the power signal and a second signal component representing the control data from the control signal, the first and second signal components using different frequencies.

6. The mobile computing device of claim 5, the power line communications control module operative to form the power data signal with the first signal component having a lower frequency than the second signal component.

7. The mobile computing device of claim 5, the power line communications control module operative to form the power data signal with the first signal component having a higher frequency than the second signal component.

8. The mobile computing device of claim 1, the power supply comprising an alternating current power line, and the power signal is an alternating current signal.

9. The mobile computing device of claim 1, the power supply comprising a battery, and the power signal is a direct current signal.

10. The mobile computing device of claim 1, the power line communications control module further comprising a modulation module operative to modulate the power signal with the control data from the control signal to form the power data signal.

11. The mobile computing device of claim 1, the power line communications control module comprising a modulation module operative to modulate the power signal with the control data from the control signal to form the power data signal using orthogonal frequency division multiplexing modulation.

12. The mobile computing device of claim 1, the power line communications control module comprising a power coupling module to couple to the power lines, the power coupling module operative to receive the power signal from the power supply and send the power data signal to the device component over the power line.

13. The mobile computing device of claim 1, wherein one of the device components comprises a touchscreen display, a keyboard, a camera, a display or a communications component.

14. The mobile computing device of claim 1, the device component comprising a demodulation module to demodulate control data representing the control signal from the power data signal.

15. A method comprising:
    receiving a power signal for a device component from a power supply;
    receiving a control signal for the device component from a processor;
    modulating the power signal with control data from the control signal to form a power data signal;
    coupling a power line to the device component;
    selecting the power line coupled to the device component for use in communicating the power data signal; and
    sending the power data signal to the device component over the power line.

16. The method of claim 15, further comprising:
    receiving a power data signal from a device component;
    demodulating the power data signal into separate control and power signals; and
    filtering control data from the control signal for the receiving device component.

17. The method of claim 15, further comprising combining more than one control signal with the power signal to form the power data signal, wherein one or more of the control signals includes data.

18. The method of claim 15, further comprising forming the power data signal with a first signal component representing the power signal and a second signal component representing the control data from the control signal, the first and second signal components using different frequencies.

19. The method of claim 18, further comprising forming the power data signal with the first signal component having a lower frequency than the second signal component.

20. The method of claim 18, further comprising forming the power data signal with the first signal component having a higher frequency than the second signal component.

21. An article of manufacture comprising a computer-readable storage medium containing instructions that if executed enable a system to:
- receive a power signal for a device component from a power supply;
- receive a control signal for the device component from a processor;
- modulate the power signal with control data from the control signal to form a power data signal;
- couple a power line to the device component;
- select the power line coupled to the device component for use in communicating the power data signal; and
- send the power data signal to the device component over the power line.

22. The article of claim 21, further comprising instructions that if executed enable the system to:
- receive a power data signal from a device component;
- demodulate the power data signal into separate control and power signals; and
- filter control data from the control signal for the receiving device component.

23. The article of claim 21, further comprising instructions that if executed enable the system to combine more than one control signal with the power signal to form the power data signal, wherein one or more of the control signals includes data.

24. The article of claim 21, further comprising instructions that if executed enable the system to form the power data signal with a first signal component representing the power signal and a second signal component representing the control data from the control signal, the first and second signal components using different frequencies.

25. The article of claim 24 further comprising instructions that if executed enable the system to form the power data signal with the first signal component having a lower frequency than the second signal component.

26. The article of claim 24, further comprising instructions that if executed enable the system to form the power data signal with the first signal component having a higher frequency than the second signal component.

* * * * *